US012757248B2

(12) United States Patent
Niu et al.

(10) Patent No.: US 12,757,248 B2
(45) Date of Patent: Oct. 6, 2026

(54) SIDELINK UNLICENSED (SL-U) GAP SYMBOL AND CYCLIC PREFIX EXTENSION (CPE) CONFIGURATION

(71) Applicant: Apple Inc., Cupertino, CA (US)

(72) Inventors: Huaning Niu, San Jose, CA (US); Dawei Zhang, Saratoga, CA (US); Wei Zeng, Saratoga, CA (US); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 279 days.

(21) Appl. No.: 18/597,322

(22) Filed: Mar. 6, 2024

(65) Prior Publication Data

US 2024/0349333 A1 Oct. 17, 2024

Related U.S. Application Data

(60) Provisional application No. 63/494,961, filed on Apr. 7, 2023.

(51) Int. Cl.

*H04L 12/00* (2006.01)
*H04L 27/26* (2006.01)
*H04W 72/40* (2023.01)
*H04W 74/0808* (2024.01)

(52) U.S. Cl.

CPC ..... *H04W 74/0808* (2013.01); *H04L 27/2607* (2013.01); *H04W 72/40* (2023.01)

(58) Field of Classification Search

CPC . H04W 74/0808; H04W 72/40; H04W 92/18; H04W 4/40; H04W 4/44; H04W 4/46; H04W 72/0446; H04W 72/25; H04L 27/2607; H04L 5/0007; H04L 27/2602; H04L 27/26025; H04L 27/2646

USPC .......................................................... 370/329

See application file for complete search history.

(56) References Cited

U.S. PATENT DOCUMENTS 11,785,639 B2 * 10/2023 Myung ............. H04W 74/0808 370/329
11,825,475 B2 * 11/2023 Liu ....................... H04W 72/20
12,238,657 B2 * 2/2025 Ko ........................ H04W 56/00
2022/0394762 A1 12/2022 Bhattad
2023/0132263 A1 * 4/2023 Ye ......................... H04W 72/12 370/329

(Continued)

FOREIGN PATENT DOCUMENTS

WO 2021208031 A1 10/2021

OTHER PUBLICATIONS

Japanese Office Action dated Apr. 24, 2025 in connection with Application No. 2024-062117.

(Continued)

*Primary Examiner* — Frantz Coby

(74) *Attorney, Agent, or Firm* — Eschweiler & Potashnik, LLC; Ningjiao Zhang

(57) ABSTRACT

A user equipment (UE), a base station, a baseband processor or other network device can operate to generate a sidelink (SL) communication by sensing an SL channel with a clear channel assessment (CCA) and configuring a gap length based on a subcarrier spacing (SCS) and a cyclic prefix extension (CPE) with a CPE length. The CPE length and the gap length can be based on one or more conditions. The SL communication can then be transmitted in response to acquiring the SL channel.

20 Claims, 10 Drawing Sheets

(56) References Cited

U.S. PATENT DOCUMENTS

2023/0146161 A1* 5/2023 Sun .................... H04L 27/2607 370/329
2024/0114491 A1* 4/2024 Farag .................... H04L 5/0073

OTHER PUBLICATIONS

Fraunhofer HHI, Fraunhofer IIS; "NR Sidelink Unlicensed Channel Acess Mechanisms"; 3GPP TSG WG1 Meeting #112; R1-230489; Feb. 27, 2023.
Panasonic; "Sidelink channel access on unlicensed spectrum"; 3GPP TSG RAN WG1 #110; R1-2207298; Aug. 22, 2022.
Apple Inc.; "On channel access mechanism for sidelink on FR! unlicensed spectrum"; 3GPP TSG-RAN WG1 Meeting #112;R1-2301346; Feb. 27, 2023.
Apple Inc.; "On channel access mechanism for sidelink on FR! unlicensed spectrum"; 3GPP TSG-RAN WG1 Meeting #111; R1-2211814.
European Search Report dated Aug. 20, 2024 in connection with Application Serial No. EP24168252.
Fraunhofer HHI et al., R1-2301189, NR Sidelink Unlicensed Channel Access Mechanisms, 3GPP TSG RAN WG1 #112; Feb. 27, 2023.
Moderator (OPPO), R1-2301797, FL summary for Al 9.4.1.1: SL-U channel access mechanism (EOM), 3GPP TSG RAN WG1 #112; Feb. 27, 2023.
Korean Office Action mailed Apr. 14, 2026 in connection with Application No. 10-2024-0046563.
India Exam Report dated Jul. 5, 2026 in connection with application No. 202414028338.

* cited by examiner

SIDELINK UNLICENSED (SL-U) GAP SYMBOL AND CYCLIC PREFIX EXTENSION (CPE) CONFIGURATION

CROSS-REFERENCE TO RELATED APPLICATIONS

The application claims the benefit of U.S. Provisional Patent Application 63/494,961 filed Apr. 7, 2023, entitled "SIDELINK UNLICENSED (SL-U) GAP SYMBOL AND CYCLIC PREFIX EXTENSION (CPE) CONFIGURATION", the contents of which are herein incorporated by reference in their entirety.

FIELD

The present disclosure is related to wireless technology and a gap symbol and a cyclic prefix extension (CPE) configuration for sidelink (SL) unlicensed (SL-U) configurations.

BACKGROUND

As the number of mobile devices within wireless networks, and the demand for mobile data traffic, continue to increase, changes are made to system requirements and architectures to better address current and anticipated demands. For example, some wireless communication networks (e.g., fifth generation (5G) or new radio (NR) networks) may be developed to include UE to UE (U2U) relay communications or UE to network (NW) (U2N) relay communications. In such scenarios, path sidelink (SL) relay enhancements can be made.

DETAILED DESCRIPTION

Figure 1:
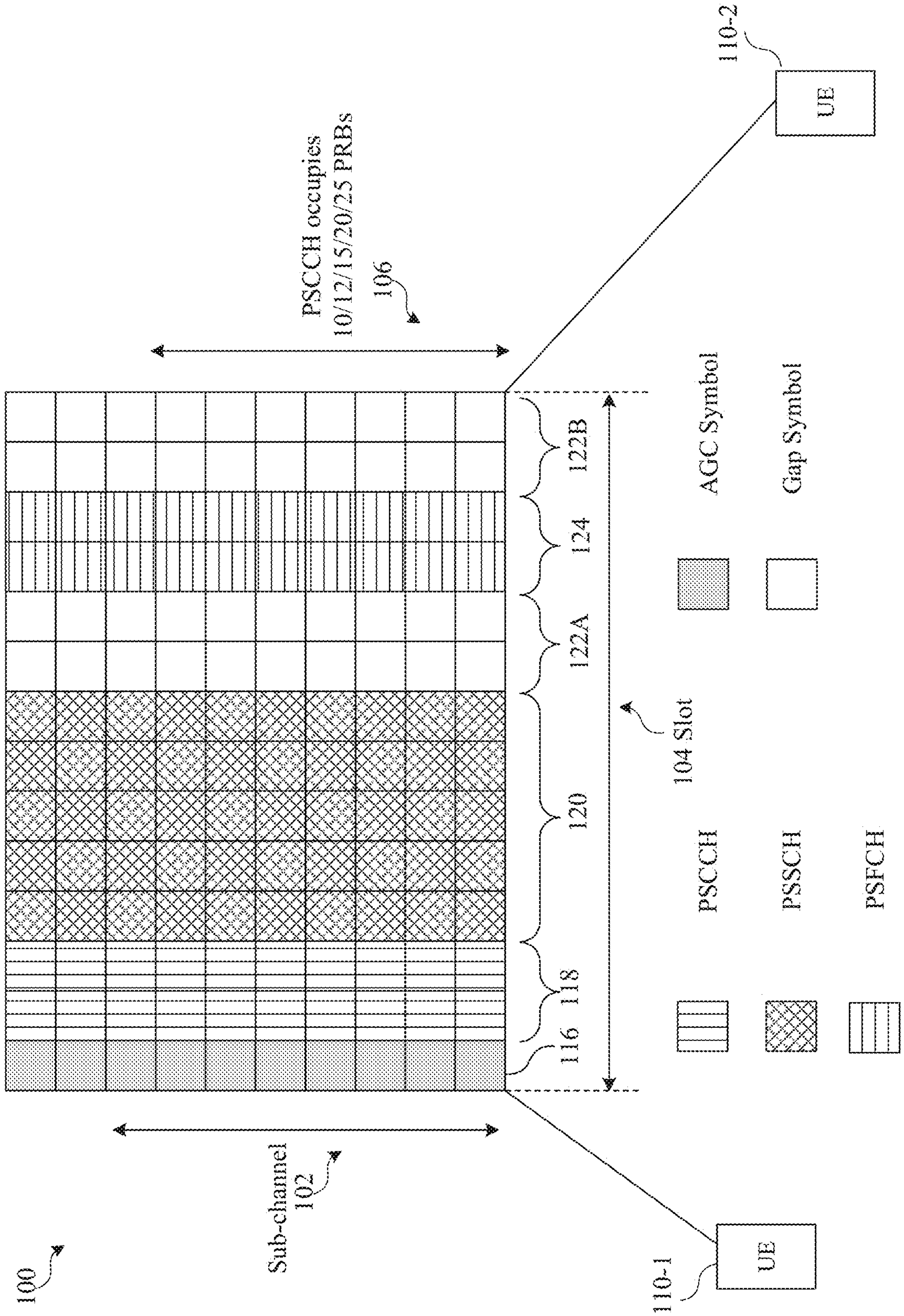
FIG. 1 illustrates an example slot structure for sidelink (SL) communication in accordance with various aspects.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Various aspects including a user equipment (UE) device enabling sidelink (SL) communication are described herein. A UE device can be a pedestrian UE (P-UE) device, a vehicle-to-everything (V2X) device, or other UE that may include vehicle-to-vehicle (V2V), vehicle-to-infrastructure (V2I ), vehicle-to-pedestrian (V2P) device communication, or other UEs operating with direct SL communication. A UE can also include a Roadside Unit (RSU), a drone, other vehicle device, Internet of Things (IoT) device, or other UE device, for example. Different types of communications are considered in new radio (NR) devices to fulfill requirements for vehicle networks, including operation in NR unlicensed (NR-U) networks. The use cases may involve different types of communication types, including V2V, V2I, V2P, V2N, or the like on SL unlicensed (SL-U) communication channels.

In particular, when configuring a dedicated SL channel between UEs in an out-of-coverage scenario or in an unlicensed NR network in SL-U, an initiating/initiator UE device initially senses the SL channel to determine whether it is busy or not. Upon acquiring the SL channel with a clear channel assessment (CCA) operation, the initiating UE can provide SL control information (SCI) in two stages: a first stage SCI and a second stage SCI, which can be carried on a physical SL control channel (PSCCH) or a physical SL shared channel (PSSCH). The first stage SCI includes information to enable sensing operations on the acquired SL channel, as well as information about resource allocation. The second stage SCI can carry information to enable identification and decoding of the SL channel, as well as control for Hybrid Automatic Repeat Request (HARQ) procedures, triggering for channel state information (CSI) feedback, or related feedback information (e.g., ACK/NACK feedback). The SL shared channel or PSSCH also carries the transport block (TB) of data for transmission, in which the SCI further includes information for the correct reception of the TB to enable the SL data to be received and properly decoded.

Additional SCI information can be configured by an initiating UE. For example, various clear channel assessments (CCAs) can be indicated in the SCI so that when channel occupancy time (COT) sharing is being signaled to enable the receiver UE to share the same COT with the initiating UE for SL transmission, the receiving UE performs a CCA that is shorter than a complete/full CCA (e.g., a category 4 (CCA)). By performing a shorter CCA, such as a single/one shot CCA, for example, the SL communications between paired UEs devices can be efficiently maintained without wasting resources. In dynamic channel access where COT sharing is indicated by SCI or by radio resource control (RRC) configuration, an SL UE can perform Type 1 (complete CCA with a random back-off number generation) or one of the Type 2 LBTs (shorter CCAs than Type 1) before SL transmission by using the selected/reserved resources, in compliance with a transmission gap and a listen before talk (LBT) sensing window.

In an aspect, the UE can sense the SL channel with a CCA and generate an SL transmission by configuring a gap length in an SL slot based on a subcarrier spacing (SCS) and a cyclic prefix extension (CPE) with a CPE length when the SL channel is acquired. The gap length and the CPE length can be based on one or more conditions or channel types. For example, if the SCS or orthogonal frequency division multiplexing (OFDM) numerology is 60 kHz SCS, a slot gap can be configured with a gap length that is up to two gap symbols. This gap length configuration can ensure completion of the CCA types for COT sharing and non-COT sharing, especially with 60 kHz SCS. The gap symbols can be contiguous to one another. Further, this gap length can be configured before a physical SL feedback channel (PSFCH) transmission within a slot or multiple slots, at an end portion of one or more slots, or both before the PSFCH transmission and at the end of one or more slots according to various channels and conditions. Additional aspects and details of the disclosure are further described below with reference to figures.

FIG. 1 illustrates an example of an SL slot for SL communications 100 in an NR unlicensed network between an initiating UE (e.g., 110-1) and a receiving UE (e.g., 110-2). As noted herein, SL communication refers to direct communication between two or more UEs without traversing a network node or base station. The SL slot 104 includes a number of symbols (e.g., 14 symbols, or other number) that each include resource blocks (RBs) spanning the vertical axis of each sub-channel 102. Some symbols include PSCCH 118 and PSSCH 120, in which PSSCH 120 can occupy up to a number of physical resource blocks (PRBs) 106 (e.g., up to 10, 12, 15, 20, 25, etc. PRBs). The SL slot 104 includes resources with PSCCH 118 and PSSCH 120, as well as an automatic gain control (AGC) symbol 116 as a first symbol, gap symbols 122A and 122B, and physical SL feedback channel (PSFCH) symbols 124. The SL slot 104 can be configured with more or less symbols than illustrated, for example, which can be transmitted in a smaller or large time block in various applications.

The SL slot 104 includes a first symbol comprising the AGC symbol 116, which could be a copy of the second symbol or another OFDM symbol for automatic gain control purposes such as for power level control in the SL receiver UE 110-2. Following symbols include a first stage (stage one/stage 1) SCI on PSCCH 118 with information to enable sensing operations, and pertain to resource allocation of the PSSCH 120. The SCI can include a first stage SCI on PSCCH 118 with various information for sensing and resource mapping, as well as a second stage SCI on PSSCH 420, which can be multiplexed with the PSCCH 118. The PSFCH 124 can be utilized to transmit HARQ feedback for ACK/NACK information from the receiver UE 110-2 to a transmitter/initiating UE 110-1 on the SL channel for a unicast or groupcast communication.

SL communication for improved road safety, increased traffic efficiency, infotainment, or other enhancement could take place in any one of a following network coverage scenarios: 1) in-coverage, when the communicating UEs on SL (e.g., P-UEs or vehicle UEs (V-UEs)) are located with the coverage of a base station (e.g., new radio gNB); 2) out-of-coverage, when all communicating UEs are out of coverage of any base station (or gNB); and 3) partial-coverage, when at least one of the UEs is in-coverage and communicatively coupled to a base station.

The SCI is further configured to include indications (fields or parameters) to enable COT sharing, which may or may not be initiated by a base station (e.g., gNB or the like). COT sharing can be enabled on an SL-U COT when the initiating UE has acquired the SL channel and is able to share any remaining resources not being used after configuring resources for a SL transmission with the receiving UE 110-2. In turn, the receiving UE 110-2 uses similar resources as indicated by the initiating UE 110-1 to transmit over the SL channel for performing SL dedicated communication on an NR unlicensed network.

In an aspect, the UE 110-1 can sense an SL channel with a CCA and generate SL communication by configuring a gap length based on the SCS, as well as a CPE according to a CPE length that is based on one or more conditions or channels when acquiring the SL channel. For example, the gap length can comprise up to two gap symbols (or two OFDM symbols) when configuring the SL communication with a 60 kHz SCS, and only one gap symbol for other SCSs (e.g., 15 kHz or 30 kHz SCS). Additionally, or alternatively, the gap length of a gap symbol (or guard symbol) can operate as a place holder in a slot transmission with up to two contiguous gap symbols before a physical SL feedback channel (PSFCH) transmission, at an end of a slot, or both before the PSFCH transmission and at the end of the slot, as illustrated in FIG. 1 with gap symbols 122A and 122B. Before the PSFCH transmission can mean immediately or just before the PSFCH symbol(s) 124 in the slot 104, for example. The gap symbols can be contiguous to one another and the PSFCH symbol 124, or after the PSFCH symbol 124 if at the end of slot 104 with gap symbols 122B, for example.

Configuring up to two gap symbols or a double gap symbol within a slot with 60 kHz SCS can operate as a solution for configurations specific to 60 kHz SCS or others where the symbol duration is less than a Type 2A CCA sensing time or a deferral duration of a Type 1 CCA. Thus, enabling and configuring up to two gap symbols or OFDM symbols for the guard period or gap can ensure an adequate time for CCA completion when COT sharing or not COT sharing in SL.

In particular, for example, when utilizing 60 kHz SCS for SL-U, the symbol duration including a cyclic prefix is 17.84 microseconds, which is shorter than a Type 2A CCA duration of 25 microseconds. Additionally, a deferral duration of Type 1 CCA can be 25 microseconds or greater (e.g., 34 microseconds) depending on an indication associated with a channel access priority class (CAPC) p. Thus, a single gap symbol length may not be sufficient without configuring the gap length to be up to two symbols (gap or OFDM symbols), especially given Type 1 CCA can be of variable length before a slot transmission starting time.

For example, a number of consecutive slot durations (m_p or $m_p$) can be equal to or set to 1 for indicating 25 microseconds, or equal to or set to 2 for indicating 34 microseconds, which may or may not be associated with a CAPC. A defer duration Td can consists of a duration Tf=16 microseconds immediately followed by m_p consecutive slot durations where each slot duration is Tsl=9 microseconds, and Tf includes an idle slot duration Tsl at the start of Tf. The m_p may equal 1 where the CAPC is 1, or equal to 2 where the CAPC is 2 for transmissions. Thus, a gap symbol length of more than one symbol can ensure adequate time for the CCA for each scenario. Table 4.2.1-1 of TS 37.213 Release 17 demonstrates the CAPC for UL, as an example of CAPC and Mp slot durations incorporated herein by reference below:

TABLE 4.2.1-1

Channel Access Priority Class (CAPC) for UL

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1:

For p = 3, 4, $T_{ulmcot,p}$ = 10 ms if the higher layer parameter absenceOfAnyOtherTechnology-r14 or absenceOfAnyOtherTechnology-r16 is provided, otherwise, $T_{ulmcot,p}$ = 6 ms.

NOTE 2:

When $T_{ulmcot,p}$ = 6 ms it may be increased to 8 ms by inserting one or more gaps. The minimum duration of a gap shall be 100 us. The maximum duration before including any such gap shall be 6 ms.

In an aspect, a gap length of up to two gap symbols can be configured at the end of a slot for 60 kHz SCS. This can be configured for each slot transmission or in multi-slots for transmissions using a partial bandwidth (BW) of a resource block (RB) set, where a complete of full BW can be the entire RB set with a component carrier (CC) bandwidth of 20 MHZ, for example. In a single slot transmission, configuring a gap length of up to two gap symbols within a slot can allow for the CCA to be performed completely or successfully just before an SL transmission when 60 kHz SCS is being employed. When COT sharing is active or being utilized, the sensing length is about 25 microseconds. In a non-COT sharing case or where there is no SL COT sharing communication, the gap can enable successful sensing before the SL transmission after finishing type 1 CCA before the slot starting time. Due to shorter OFDM symbol lines with a 60 kHz SCS, an additional gap symbol can be generated during the calculation of the CCA to accommodate the slot configuration accordingly. The 15 and 30 kHz SCS, however, can re-use a legacy configuration in SL. Generally, SL for frequency range 1 (FR1) includes SCS support for 15 kHz, 30 kHz, and 60 kHz SCS, but other frequency ranges and SCS may also be utilized in various aspects throughout this disclosure.

In another aspect, the CPE is used in unlicensed bands for both license assisted access (LAA) or NR-U, and operates to fill the transmission gap after contention operations (e.g., CCA) finish and before SL transmission begins. The CCA for SL transmission can utilize a 9 microsecond slot CCA time, for example, coming from the Wi-Fi or unlicensed band, which is an asynchronous transmission. When the CCA finishes, the UE can start transmission. However, the 3GPP system can be a synchronous transmission, and thus, SL transmission starts within a minimum of a symbol boundary resulting in a small time gap that should be filled, which is a function of the cyclic prefix (CP) extension (CPE, or, extended cyclic prefix (ECP)) where there is some information trying to hold the transmission back for alignment purposes.

In particular, a CPE can be transmitted from a CPE starting position before SL transmission according to various aspects. In one example, the CPE can be within a symbol or symbol position/length just before a next AGC symbol. Alternatively, or additionally, the CPE can be based on the SCS. For example, the CPE can be within a symbol or symbol position/length just before the next AGC for 15 kHz SCS and within at most or up to two symbols (or symbol positions/lengths) just before the next AGC symbol for 30 or 60 kHz SCS.

Figure 2:
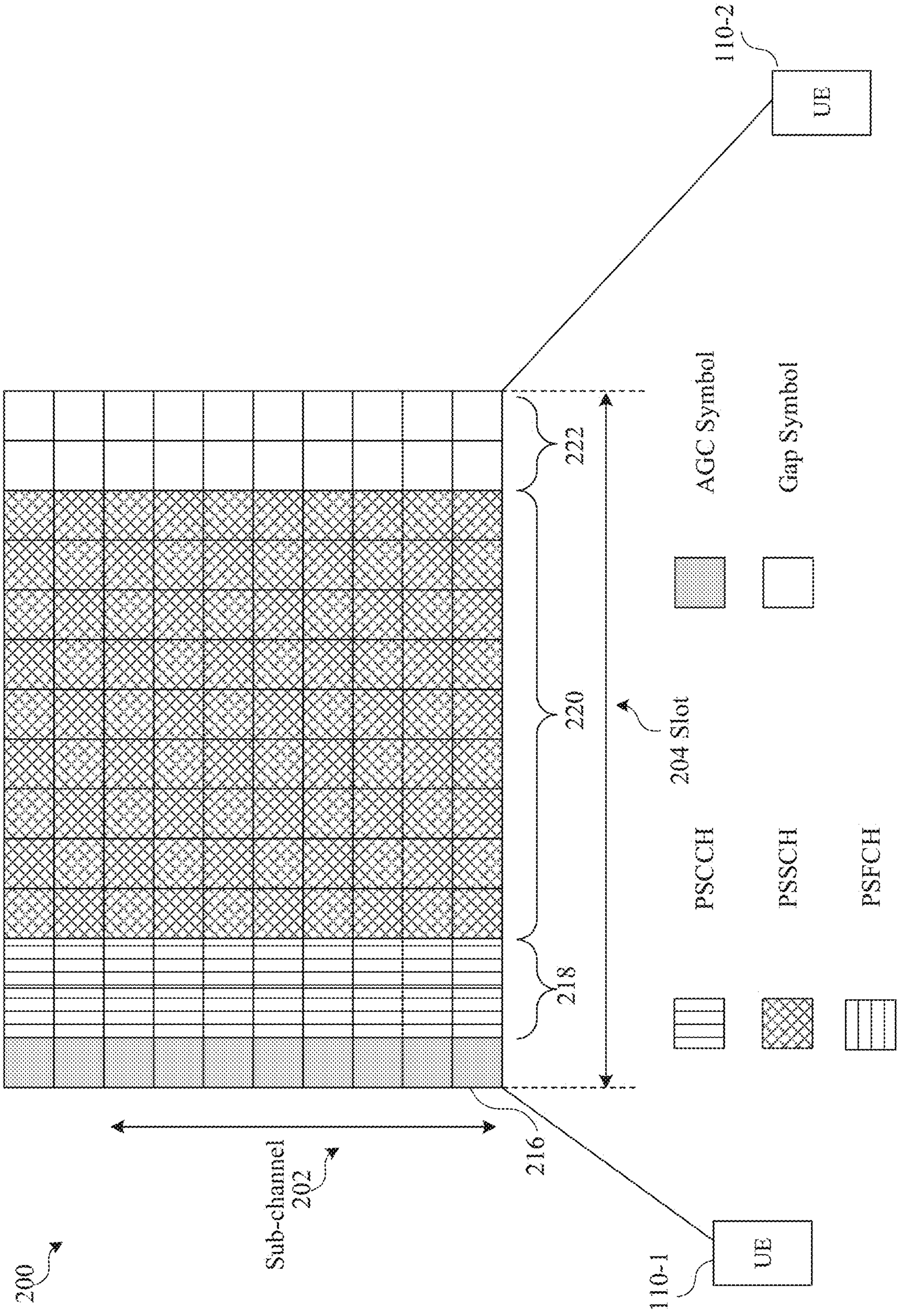
FIG. 2 illustrates another example slot structure for sidelink (SL) communication in accordance with various aspects.

FIG. 2 illustrates an example of an SL slot for SL communications 200 in an NR unlicensed network between the initiating UE 110-1 and the receiving UE 110-2. Here, the SL slot 204 structure/configuration is similar to the SL slot 104 of FIG. 1, but does not include a PSFCH symbol or ACK/NACK channel, with only one gap symbol or one set of gap symbols 222. A single gap length can be configured at an end portion of slot 204. The SL slot 204 includes symbols that each include resource blocks spanning the vertical axis of each sub-channel 202. The symbols of slot 204 also include an AGC symbol 216, PSCCH symbols 218, PSSCH symbols 220, and gap symbols 222 with a gap length that is up to two gap symbols at an end of the slot 204 in FIG. 2.

In a single slot transmission, configuring a gap length of up to two gap symbols 222 at the end of a slot can allow for the CCA to be performed completely just before an SL transmission with 60 kHz SCS. When COT sharing is active or being utilized, the sensing length is about 25 microseconds where a Type 2A sensing is utilized. In a non-COT sharing case or where there is no SL COT sharing communication, the gap can enable successful sensing before the SL transmission after finishing Type 1 CCA before the slot starting time. COT sharing can be utilized when the initiating UE 110-1 does a Type 1 CCA and the COT resources are able to be shared with the responding UE 110-2 when the initiating UE does not use all COT resources at access of the SL channel. The responding UE then only needs to do a one shot CCA to obtain the shared COT in SL. As such, a gap length of up to two gap symbols 222 at the end of a slot can ensure that the CCA be performed completely and properly for 60 kHz SCS.

Figure 3:
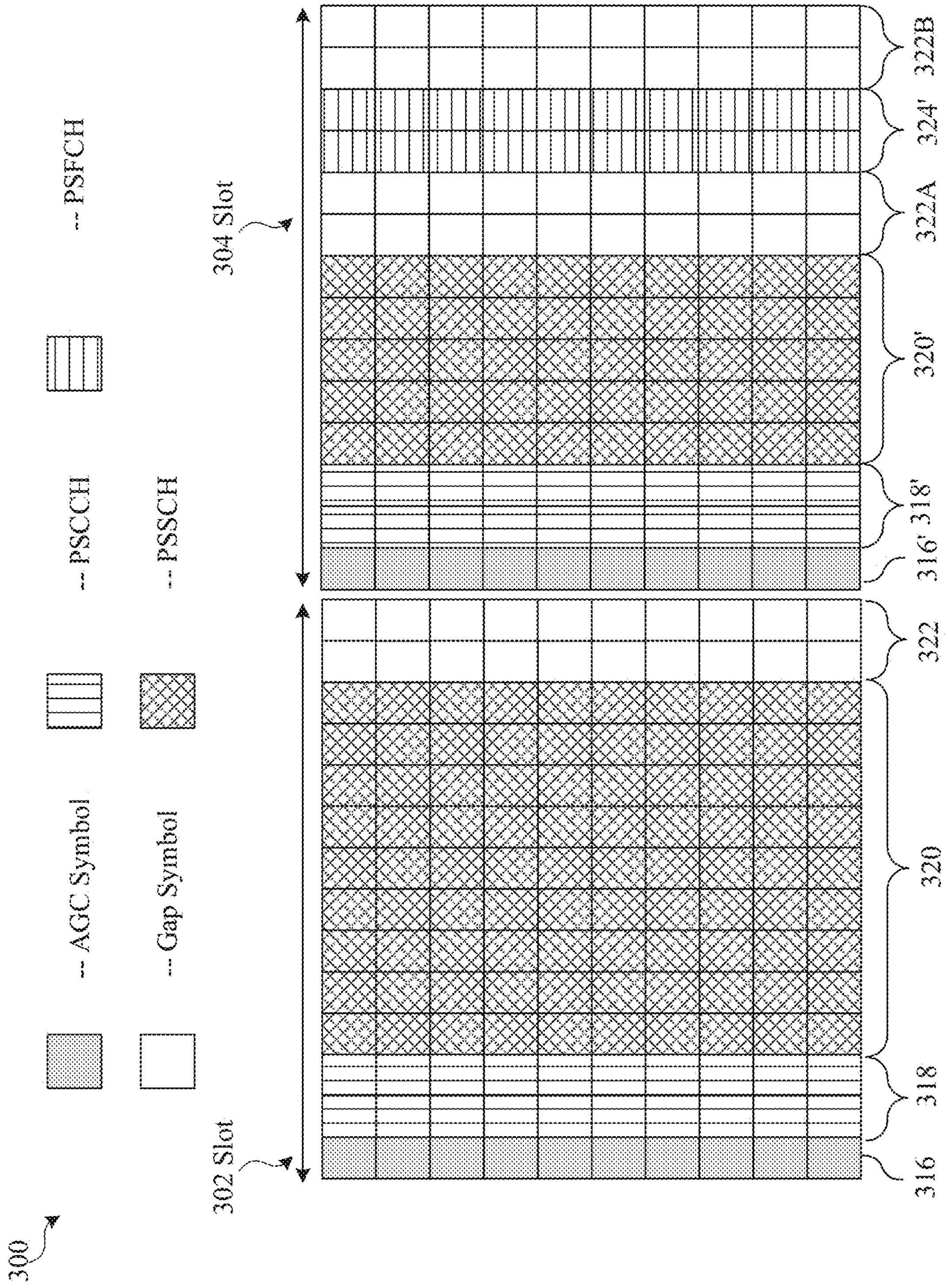
FIG. 3 illustrates an example multi-slot structure for sidelink (SL) communication in accordance with various aspects.
Figure 4:
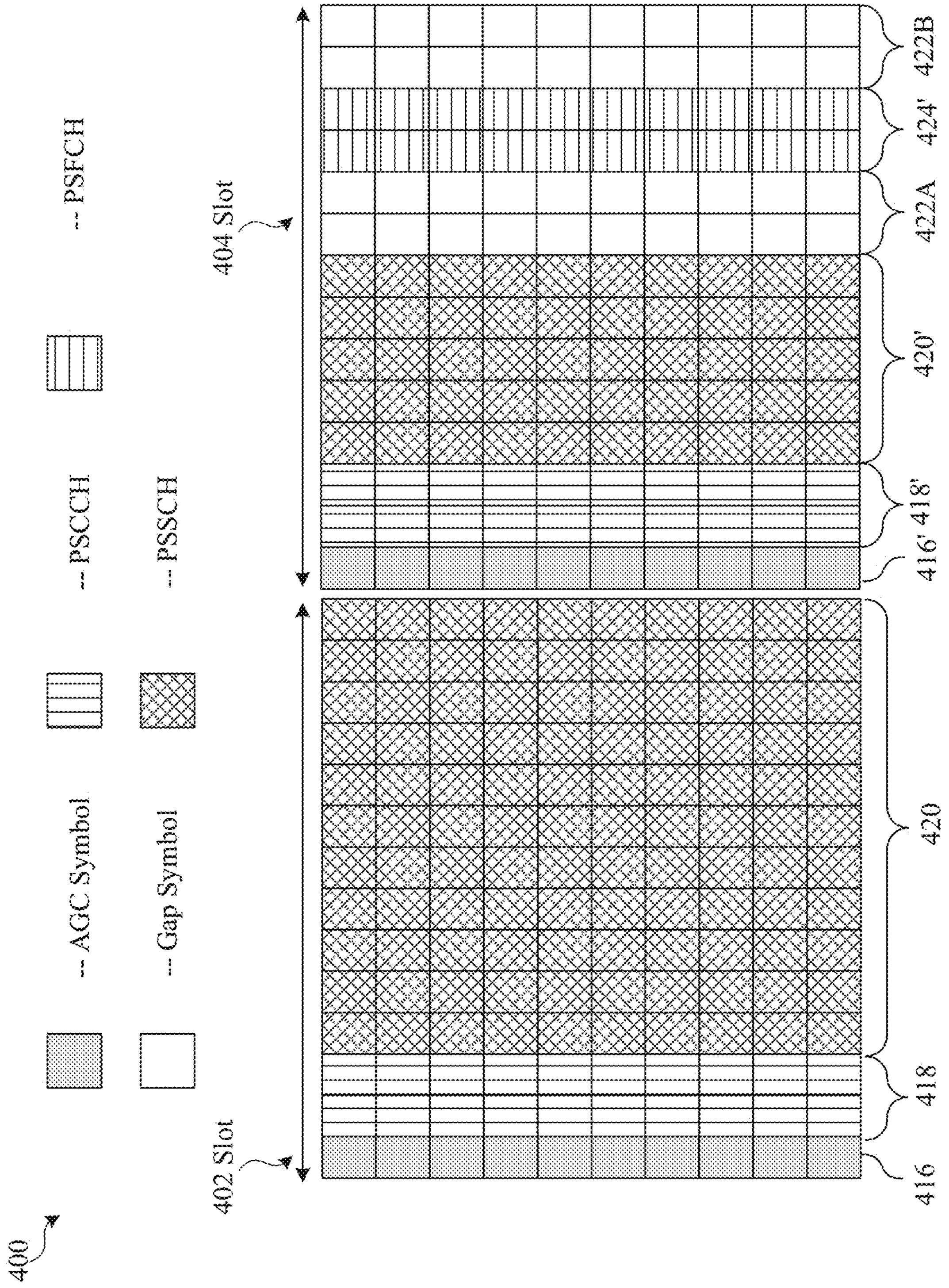
FIG. 4 illustrates another example multi-slot structure for sidelink (SL) communication in accordance with various aspects.

FIGS. 3 and 4 illustrate examples of a multi-SL slot transmission for SL-U communications 200. FIG. 3 illustrates slots 302 and 304 as a multi-slot SL communication structure 300 utilizing a partial BW of an RB set transmission, while FIG. 4 illustrates slots 402 and 404 of a multi-slot communication structure 400 utilizing a full BW of an RB set transmission.

Slot 302 of FIG. 3 includes the AGC symbol 316, the PSCCH 318 symbols, a set of PSSCH symbols 320 and a gap symbol or set of gap symbols 322 with a gap length. Slot 304 includes the AGC symbol 316', the PSCCH 318', the PSSCH 320', a first gap length with gap symbol(s) 322A, a PSFCH 324, and second gap length with gap symbol(s) 322B. The gap symbols 322, 322A and 322B can be configured with lengths of up to two gap symbols for 60 kHz SCS, and less than two symbols (e.g., 1 symbol) for other SCSs.

Where multiple slots (e.g., slots 302, 304 or additional slots) comprise the SL communication 300, the end of each slot can include a gap length of up to two gap symbols when a partial BW transmission of an RB set is being utilized. Thus, each slot of an SL transmission can be configured with at least one gap symbol at an end portion of slot symbols when utilizing a partial BW for a multi-slot SL communication, regardless of the SCS being utilized such as for 15 kHz SCS, 30 kHz SCS, or 60 kHz SCS.

Alternatively, or additionally, whether each slot in a multi-slot SL transmission configures a gap length at the end of each slot can be based on an indication of the SCI for a dynamic configuration. However, if the SCI does not provide any indication of whether to configure a gap length (e.g., up to two gap symbols) at the end of each slot in a multi-slot SL transmission, a default configuration for a partial BW of an RB set can be to enable the gap symbol(s) at the end of each slot (e.g., slots 302 and 304) of the multi-slot SL transmission. Alternatively, the default configuration for a partial BW can be to configure a gap length (e.g., up to two gap symbols) only at the end of the last slot (e.g., slot 304 with gap symbols 222B).

These aspects of FIG. 3 can be applied to 60 kHz SCS and to other SCSs (e.g., 15 kHz SCS, 30 kHz SCS, or other SCS) as well as 60 kHz. For example, while a 60 kHz SCS can configure the gap length to be up to two symbols, other SCSs (e.g., 15 kHz SCS, 30 kHz SCS, or other SCS) can also configure a gap length at the end of each slot in a multi-slot SL transmission as a default configuration or based on an indication of the SCI to dynamically configure each slot with a gap length at the end of the slot or not. If indicated or configured by an indication of the SCI, then the SCI could determine the configuration for a gap length at the end of each slot or just the last slot of the multi-slot SL transmission based on the indication of the SCI.

Additionally, or alternatively, other gap configurations can be configured within each slot 302 or 304, respectively. For example, before each PSFCH (e.g., PSFCH 324') a gap length of up to two gap symbols for 60 kHz and one for other SCSs can be generated. The slot 302 in this example does not have a PSFCH, while slot 304 is configured with a gap length of gap symbol(s) 322A before the PSFCH 324', for example.

FIG. 4 illustrates another example of slots 402 and 402 in a multi-slot SL transmission. However, each slot within the multi-slot SL transmission 400 does not have a gap length at the end. Slot 402 includes the AGC symbol 416, the PSCCH 418 symbols, and a set of PSSCH symbols 420 without a gap symbol or set of gap symbols at the end of the symbols. The slot 404 is similar to the slot 304 of FIG. 3, including the AGC symbol 416', the PSCCH 418', the PSSCH 420', a first gap length with gap symbol(s) 422A, a PSFCH 424, and a second gap length with gap symbol(s) 422B. The gap symbols 422A and 422B can be configured with lengths of up to two gap symbols for 60 kHz SCS, and less than two symbols (e.g., 1 symbol) for other SCSs, for example.

Where multiple slots (e.g., slots 402, 404 or additional slots) comprise the SL communication or multi-slot SL transmission, the default configuration can include a gap length of up to two symbols at the end of only the last slot 404 for all SCSs when a full BW of an RB set is being utilized. This could allow for a continuous transmission without additional CCA when a multi-slot SL communication is being configured with a full, entire or complete BW of an RB set. The UE (e.g., initiating UE 110-1) can thus, generate one slot with at least one gap symbol at the end portion of slot symbols when utilizing a full BW for the SL communication. This slot can be the last slot in a multi-slot SL transmission, for example. Similar to FIG. 3, a gap length of gap symbol(s) can be configured just before the PSFCH 424' or any other location where a PSFCH is generated within a slot (e.g., slot 404). When the SCS of the multi-slot SL transmission is 60 kHz SCS, the gap symbol or gap length can comprise up to two gap symbols, and less than two symbols for other SCSs of other SL transmissions. The gap symbol can be one symbol, for example, for 15 kHz SCS or 30 kHz SCS, where the gap symbol is mainly for Tx/Rx switching after the PSSCH transmission. However for unlicensed communications (e.g., SL-U), the gap symbol not only does Tx/Rx swtiching, but is also configured to perform CCA within the gap symbol(s)/gap length, where the CCA can have a certain length specified by 3GPP standard or regulation.

Figure 5:
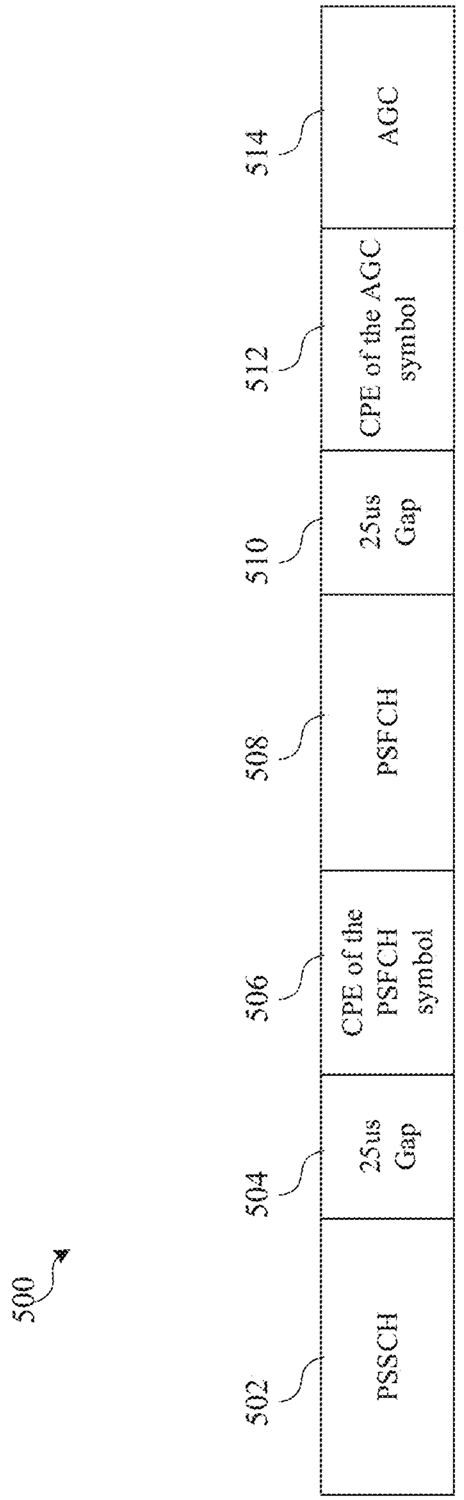
FIG. 5 illustrates an example of a signaling for SL communication in accordance with various aspects.

Referring to FIG. 5, illustrated is an example of SL channel transmission(s) 500 that can be used with determining a CPE length in accord with various aspects herein. The UE can generate an SL communication by configuring a gap length based on an SCS as well as determine CPE that comprises a CPE length based on one or more conditions when acquiring the SL channel.

Depending on COT sharing, a PSSCH symbol 502 can be followed by a gap 504 of 25 microseconds associated with a CPE 506 of the PSFCH symbol 508. This can be followed by another 25 microsecond gap 510 and CPE 512 of the AGC symbol 514. The CPE length for CPE 506 or 512 can be configured based on a pre-configured CPE length in a resource pool. In an aspect, the CPE length of the CPE (e.g., CPE 506) can be a default CPE length that is pre-configured by the resource pool according to one or more conditions. For example, when the CPE is being used in a shared COT or when COT sharing is being performed over the SL channel with at least one of: a PSCCH, a PSSCH, or a PSFCH transmission, the CPE length can be the default CPE length. In other words, one or more of: the PSCCH, the PSSCH or the PSFCH can utilize the default CPE length based on the SL resource pool when COT sharing is performed. Here, the 25 microsecond gap 504 is configured for the purpose of COT sharing and the CPE 506 or 512 is referring to a last symbol of a previous slot. Alternatively, for example, if the COT sharing is occurring with a PSCCH transmission the first symbol 502 can be followed by a similar structure of the 25 microsecond gap 504 in which a CPE is provided for a PSFCH symbol or for filling in the remainder of a gap for CCA.

Alternatively, or additionally, the CPE length can be a default CPE length pre-configured by the resource pool with only a PSFCH when the PSFCH transmission is outside of a shared COT (or part of an initiating COT transmission). This means that the SL transmission of PSFCH does not have a previous PSSCH transmission or it does not receive any of the COT sharing information to share the COT, and thus, the UE performs a Type 1 CCA before SL transmission.

Alternatively, or additionally, the CPE length can be a default CPE length pre-configured by the resource pool with at least one of: a PSCCH or a PSSCH outside of a shared COT (part of an initiating COT transmission) and when utilizing a partial BW of an RB set where the complete or entire RB set (20 MHZ) is not utilized for the SL transmission. Thus, two conditions for utilizing a default CPE length pre-configured by a resource pool for SL can be that the PSCCH/PSSCH transmission is with partial BW and outside of shared COT (UE initiated COT). Outside of a shared COT can mean a transmission is its own initiated COT. The partial BW means that the transmission is a part or subset of the RB set, which includes a CC bandwidth of 20 megahertz. If the UE is using only a part of it (e.g., one or two sub-channels), this means the data transmission will be frequency division multiplexed (FDMed) with other data transmissions. In response to these two conditions "partial BW" and "outside of the shared COT" are fulfilled, a combined the transmission will use the default CPE length with a fixed gap.

In another aspect, the CPE can be the default configuration value based on the SCS. For an SCS of 15 kHz or 30 kHz, the default CPE length can be one OFDM symbol minus 25 microseconds, for example. The default CPE length can be RRC configured, rather than based on a pre-configuration of the resource pool. For 60 kHz, with a two OFDM symbol length of a gap can be used minus 25 microseconds, giving a CPE length of 10.7 microseconds. As such, the CPE length of CPE 506 or 512 can be a value that is dependent on the SCS. A one gap symbol or two gap symbol can be intended to be a 25 microsecond gap with remaining time filled with the CPE length.

Figure 6:
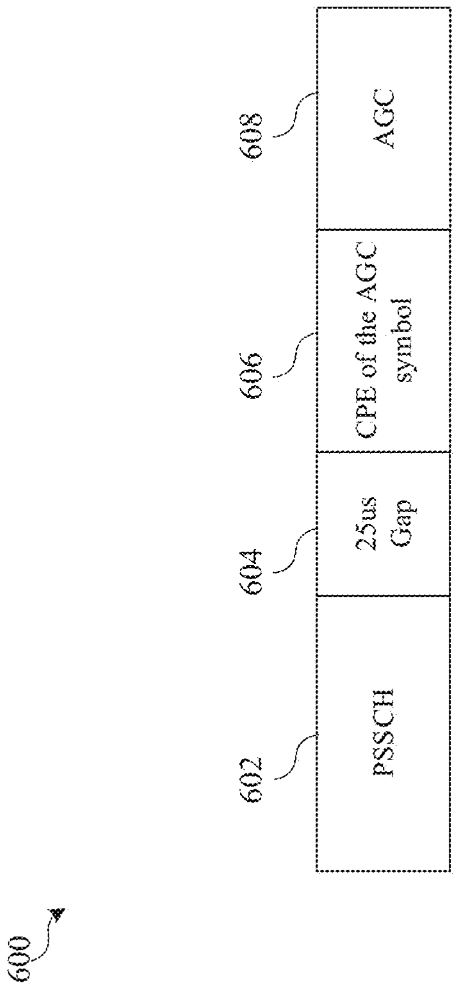
FIG. 6 another example of a signaling for SL communication in accordance with various aspects.

FIG. 6 illustrates another example of SL channel transmission(s) 500 that can be used with determining a CPE length based on a pre-configured CPE length of a resource pool or an RRC signaling as described above. Here, the start of the transmission is a PSCCH transmission or PSSCH transmission 602 followed by a 25 microsecond gap 504 and an extended CP or CPE 506 for the AGC symbol 508. If COT sharing is occurring for the data transmission (e.g., PSSCH transmission), the CPE 506 fills the last gap symbol of a previous slot, in which the CPE length can be RRC specified or according to a pre-configuration of a resource pool.

As described above, the CPE length can alternative be configured based on an SCS. In an aspect, a default CPE length can be one OFDM symbol length minus 25 microsecond gap in 15 KHZ and 30 kHz SCS. For example, for 15 kHz one OFDM symbol can be 71.4 microseconds, and thus, 71.4 minus 25 microseconds equals a 46.2 microseconds (us) default CPE length. In 30 kHz SCS, one OFDM symbol can be 35.7 us, and thus, 35.7 us minus 25 us equals a 10.7 us default CPE length. In a 60 kHz SCS with two OFDM symbol lengths, the default CPE length can be 35.7 us minus 25 us equaling 10.7 us.

Figure 7:
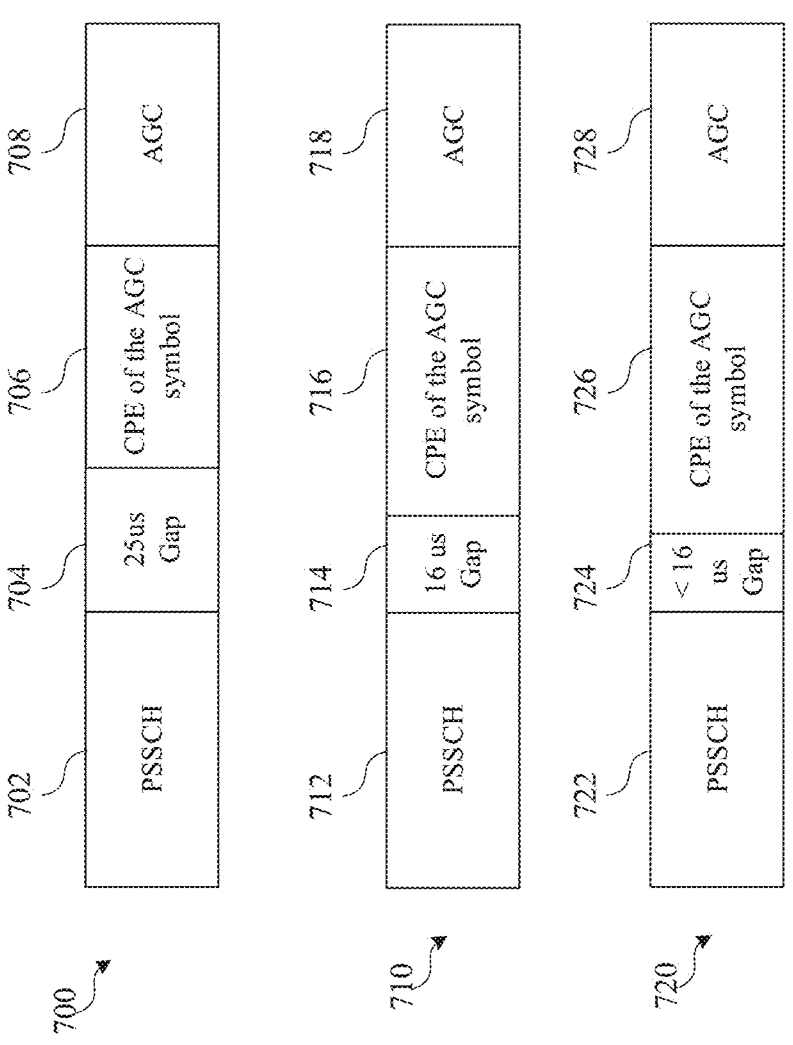
FIG. 7 anptjer example of a signaling for SL communication in accordance with various aspects.

FIG. 7 illustrates an example of a dynamic signaling 700, 710 and 720 in SCI with a shared COT for indicating the CPE length and a CCA Type. The configured CPE length and CCA Type signaled by SCI can be applied to one or more of: PSCCH/PSSCH/PSFCH that share the COT.

In some implementations, a CP extension or CPE can be implemented when Type 2 CCA is signaled to create 25 us gap 704, a 16 us gap 714, or a less than 16 us gap 724 between shared COT SL communications (e.g., upon receiving a signal from UE 110-1, UE 110-2 may implement a CP extension to create a proscribed gap between shared COT SL communications). In some implementations, a CP extension may be used when type 1 CCA is signaled. In such scenarios, a CP extension may not be enabled for partial BW scenarios (e.g., scenarios in which a CG from base station 122 involves a partial BW). By contrast, a CP extension may be enabled for full BW scenarios (e.g., scenarios in which a CG from base station 122 involves a full BW).

In addition to the static configurations described with previous figures, a dynamic update or change of the CPE lengths and CCA Type can be configured based on the SCI information sent on the PSCCH or PSSCH 702, 712, 722 depending on whether it is in stage 1 or stage 2. When COT sharing information, the CPE lengths and CCA Type can be part of the SCI stage 1 or stage 2 SCI. When indicated via the SCI, the UE can dynamically override the previous RRC configuration with the following one indicated in the most recent SCI received. As a result, the CPE length and CCA Type can be applied to one or more of PSCCH/PSSCH/PSFCH, such as with all the shared channels for a shared COT, for example.

In an aspect, a two bit signaling can be configured, for example, to signal a combination of CCA Type and the CPE. For a CCA Type 2A, the CPE is the difference between one OFDM symbol (or two for 60 kHz SCS) length and 25 us. Type 2A CCA is 25 microsecond time and the CPE length is for CCA Type 2A, where CPE 706 is 1 (or 2 for 60 kHz SCS) OFDM symbol length−25 us in length. For a CCA Type 2B, the CPE 716 is 1 (or 2 for 60 kHz SCS) OFDM symbol length−16 us in length at the signaling 710. The CCA time is 16 microseconds so the CPE 716 is one symbol minus the gap 714. CCA Type 2C is less than 16 microseconds, so when there is no need to do CCA anymore and the CPE 716 fills the remainder of the gap. For CCA Type 2C, CPE 726 is greater than 1 (or 2 for 60 kHz SCS) OFDM symbol length−16 microseconds. AGC symbols 708, 718, and 728 can follow each CPE 706, 716 and 726, respectively.

Thus, each of the CPE lengths can be dependent on the gap length. Where a gap symbol is much longer than another the CCA length, CPEs can be utilized to extend the CCAs to fill the gap for reservation.

If the SCI does not include the CCA type or CPE length information, then a default value or length can be used. For a partial BW COT, if multiple UEs are initiating the COT, a dynamic signaling can cause some misalignment for starting symbol so the dynamic triggering could be applied only for a full BW COT, but not necessarily. The SCI signaling can be optional. If present the SCI can override a previous RRC configuration of the CPE length, otherwise the UE can utilize the previous or current RRC configuration.

Additionally, or alternatively, multiple CPEs can be used for a UE initiated COT (in other words, when the transmission is outside of a shared COT) and with a full BW transmission. Then the multiple CPE can be within one or two symbols. For multiple CPEs, the starting position of the CPE can be randomly chosen based on a 9 microsecond sensing slot boundary. For the case of 15 kHz SCS, the CPE can be one symbol, and then for two OFDM symbol for 30 KHZ and 60 kHz. Thus, the starting position can be randomly chosen from the sensing slot (9 us) boundary with 1 (15 kHz SCS) or 2 OFDM (30 kHz and 60 kHz) symbols.

Figure 8:
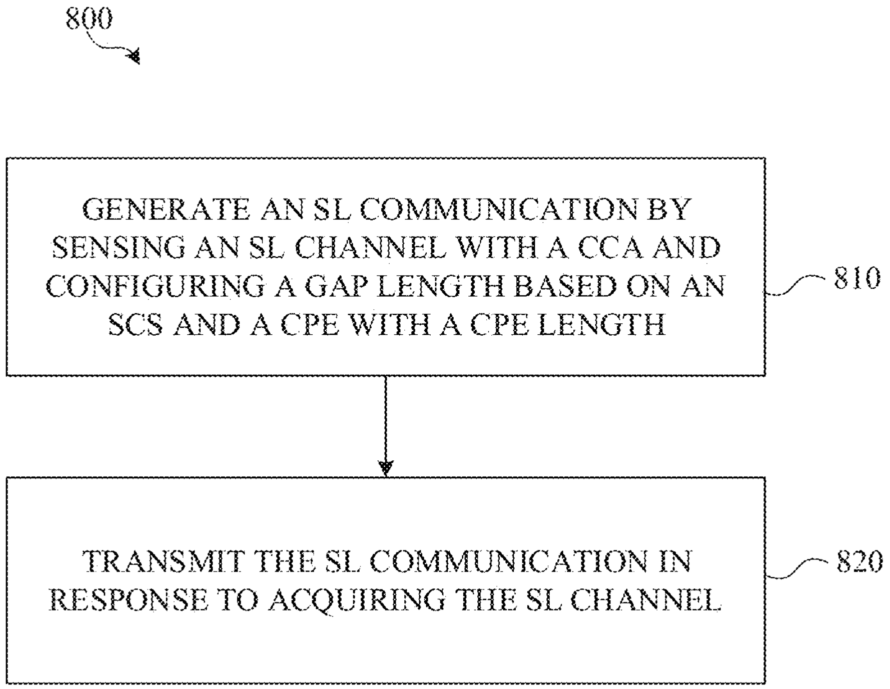
FIG. 8 illustrates an example process flow for SL communication in accordance with various aspects.

FIG. 8 illustrates an example process flow 800 for configuring an SL-U gap symbol and a CPE length for SL communication. The process flow 800 can initiate at 810 with generating a SL communication by sensing an SL channel with a CCA and configuring a gap length based on an SCS and a CPE with a CPE length. At 820, the process flow includes transmitting the SL communication in response to acquiring the SL channel.

In aspects, the process flow 800 can further include generating each slot with at least one gap symbol at an end portion of slot symbols when utilizing a partial BW for the SL communication or based on an SCI configuration. Additionally, or alternatively, one slot with at least one gap symbol at the end portion of slot symbols can be generated when utilizing a full BW for the SL communication. In response to the SCS of the SL communication comprising 60 kHz SCS, the at least one gap symbol can comprise up to two symbols, while other SCS (e.g., 15 or 30 kHz SCS) the gap symbol length can be one symbol, for example.

Figure 9:
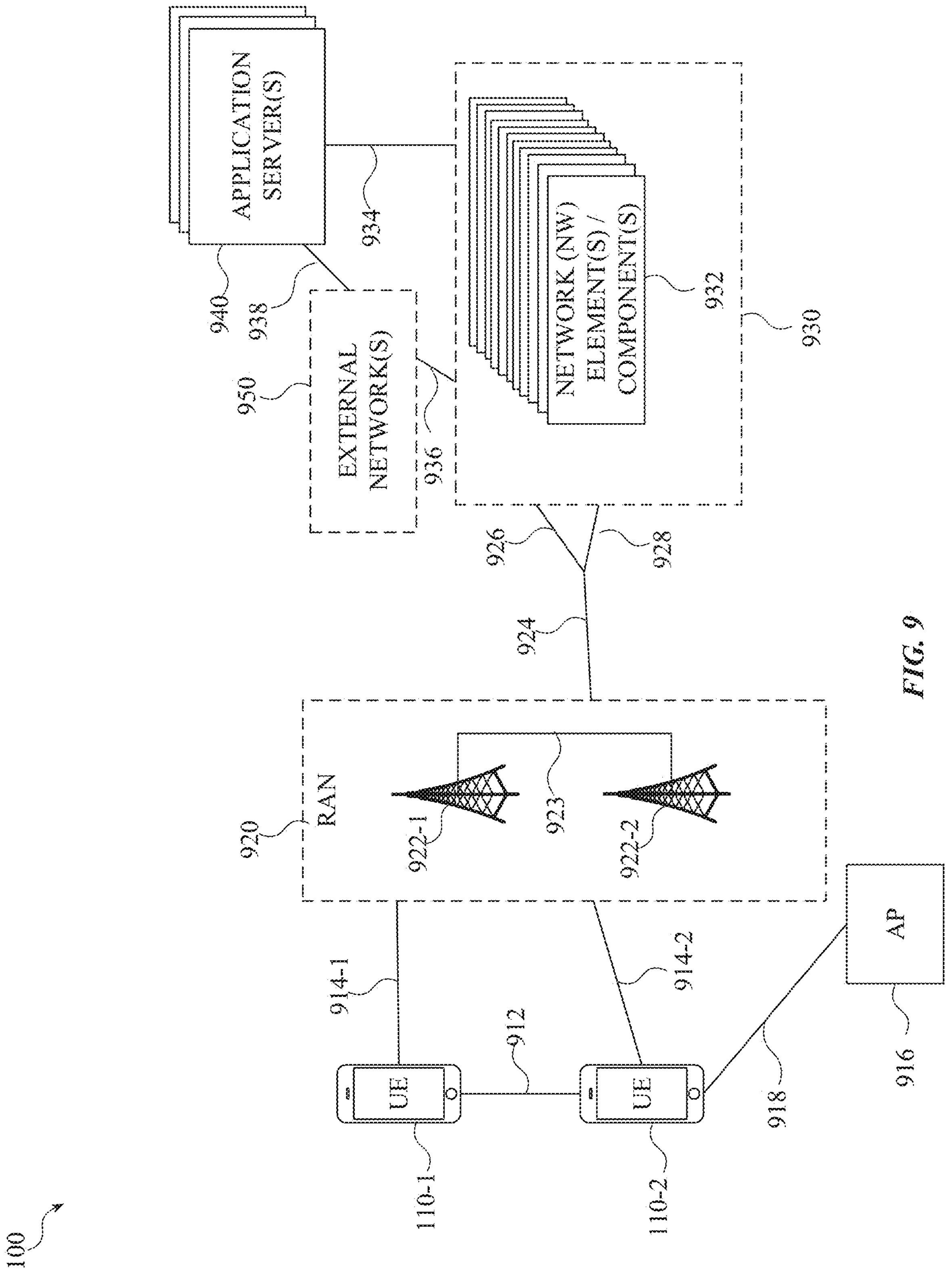
FIG. 9 illustrates an exemplary block diagram illustrating an example of user equipment(s) (UEs) communicatively coupled a network with network components as peer devices useable in connection with various embodiments (aspects) described herein.

FIG. 9 is an example network 900 according to one or more implementations described herein. Example network 900 can include UEs 110-1, 110-2, etc. (referred to collectively as "UEs 110" and individually as "UE 110"), a radio access network (RAN) 920, a core network (CN) 930, application servers 940, and external networks 950.

UEs 110 can communicate and establish a connection with (be communicatively coupled to) RAN 920, which can involve one or more wireless channels 914-1 and 914-2, each of which can comprise a physical communications interface/layer. In some implementations, a UE can be configured with dual connectivity (DC) as a multi-radio access technology (multi-RAT) or multi-radio dual connectivity (MR-DC), where a multiple receive and transmit (Rx/Tx) capable UE can use resources provided by different network nodes or base stations 922 (e.g., 922-1 and 922-2) that can be connected via non-ideal backhaul (e.g., where one network node provides NR access and the other network node provides either E-UTRA for LTE or NR access for 5G). In such a scenario, one network node can operate as a master node (MN) and the other as the secondary node (SN). The MN and SN can be connected via a network interface, and at least the MN can be connected to the CN 930. Additionally, at least one of the MN or the SN can be operated with shared spectrum channel access, and functions specified for UE 110 can be used for an integrated access and backhaul mobile termination (IAB-MT). Similar for UE 110, the IAB-MT can access the network using either one network node or using two different nodes with enhanced dual connectivity (EN-DC) architectures, new radio dual connectivity (NR-DC) architectures, or other direct connectivity such as an SL communication channel as an SL interface 112.

In some implementations, a base station (as described herein) can be an example of network node 922. As shown, UE 110 can additionally, or alternatively, connect to access point (AP) 916 via connection interface 918, which can include an air interface enabling UE 110 to communicatively couple with AP 916. AP 916 can comprise a wireless local area network (WLAN), WLAN node, WLAN termination point, etc. The connection 918 can comprise a local wireless connection, such as a connection consistent with any IEEE 702.11 protocol, and AP 916 can comprise a wireless fidelity (Wi-Fi®) router or other AP. AP 916 could be also connected to another network (e.g., the Internet) without connecting to RAN 920 or CN 930.

RAN 920 can also include one or more RAN nodes 922-1 and 922-2 (referred to collectively as RAN nodes 922, and individually as RAN node 922) that enable channels 114-1 and 114-2 to be established between UEs 110 and RAN 920. RAN nodes 922 can include network access points configured to provide radio baseband functions for data or voice connectivity between users and the network based on one or more of the communication technologies described herein (e.g., 2G, 3G, 4G, 5G, WiFi, etc.). As examples therefore, a RAN node can be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 922 can include a roadside unit (RSU), a transmission reception point (TRxP or TRP), and one or more other types of ground stations (e.g., terrestrial access points). In some scenarios, RAN node 922 can be a dedicated physical device, such as a macrocell base station, or a low power (LP) base station for providing femtocells, picocells or other like having smaller coverage areas, smaller user capacity, or higher bandwidth compared to macrocells. As described below, in some implementations, satellites 160 can operate as bases stations (e.g., RAN nodes 922) with respect to UEs 110. As such, references herein to a base station, RAN node 922, etc., can involve implementations where the base station, RAN node 922, etc., is a terrestrial network node and also to implementation where the base station, RAN node 922, etc., is a non-terrestrial network node.

Some or all of RAN nodes 922 can be implemented as one or more software entities running on server computers as part of a virtual network, which can be referred to as a centralized RAN (CRAN) or a virtual baseband unit pool (vBBUP). In these implementations, the CRAN or vBBUP can implement a RAN function split, such as a packet data convergence protocol (PDCP) split wherein radio resource control (RRC) and PDCP layers can be operated by the CRAN/vBBUP and other Layer 2 (L2) protocol entities can be operated by individual RAN nodes 922; a media access control (MAC)/physical (PHY) layer split wherein RRC, PDCP, radio link control (RLC), and MAC layers can be operated by the CRAN/vBBUP and the PHY layer can be operated by individual RAN nodes 922; or a "lower PHY" split wherein RRC, PDCP, RLC, MAC layers and upper portions of the PHY layer can be operated by the CRAN/vBBUP and lower portions of the PHY layer can be operated by individual RAN nodes 922. This virtualized framework can allow freed-up processor cores of RAN nodes 922 to perform or execute other virtualized applications, for example.

In some implementations, an individual RAN node 922 can represent individual gNB-distributed units (DUs) connected to a gNB-control unit (CU) via individual F1 interfaces. In such implementations, the gNB-DUs can include one or more remote radio heads or radio frequency (RF) front end modules (RFEMs), and the gNB-CU can be operated by a server (not shown) located in RAN 920 or by a server pool (e.g., a group of servers configured to share resources) in a similar manner as the CRAN/vBBUP. Additionally, or alternatively, one or more of RAN nodes 922 can be next generation eNBs (i.e., gNBs) that can provide evolved universal terrestrial radio access (E-UTRA) user plane and control plane protocol terminations toward UEs 110, and that can be connected to a 5G core network (5GC) 930 via a Next Generation (NG) interface 924.

Any of the RAN nodes 922 can terminate an air interface protocol and can be the first point of contact for UEs 110. In some implementations, any of the RAN nodes 922 can fulfill various logical functions for the RAN 920 including, but not limited to, radio network controller (RNC) functions such as radio bearer management, uplink and downlink dynamic radio resource management and data packet scheduling, and mobility management. UEs 110 can be configured to communicate using orthogonal frequency-division multiplexing (OFDM) communication signals with each other or with any of the RAN nodes 922 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or SL communications), although the scope of such implementations cannot be limited in this regard. The OFDM signals can comprise a plurality of orthogonal subcarriers.

A physical downlink shared channel (PDSCH) can carry user data and higher layer signaling to UEs 110. The physical downlink control channel (PDCCH) can carry information about the transport format and resource allocations related to the PDSCH channel, among other things. The PDCCH can also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) can be performed at any of the RAN nodes 922 based on channel quality information fed back from any of UEs 110. The downlink resource assignment information can be sent on the PDCCH used for (e.g., assigned to) each of UEs 110.

The PDCCH uses control channel elements (CCEs) to convey the control information, wherein a number of CCEs (e.g., 6 or other number) can consists of a resource element groups (REGs), where a REG is defined as a physical resource block (PRB) in an OFDM symbol. Before being mapped to resource elements, the PDCCH complex-valued symbols can first be organized into quadruplets, which can then be permuted using a sub-block interleaver for rate matching, for example. Each PDCCH can be transmitted using one or more of these CCEs, where each CCE can correspond to nine sets of four physical resource elements known as REGs. Four quadrature phase shift keying (QPSK) symbols can be mapped to each REG. The PDCCH can be transmitted using one or more CCEs, depending on the size of the DCI and the channel condition. There can be four or more different PDCCH formats with different numbers of CCEs (e.g., aggregation level, L=1, 2, 4, 8, or 16).

The RAN nodes 922 may be configured to communicate with one another via interface 923. In implementations where the system is an LTE system, interface 923 may be an X2 interface. In LTE networks, X2 and S1 interface are defined as the interfaces between RAN nodes and between RAN and Core Network. 5G may operate in two modes as non-standalone and standalone mode. For non-standalone operation the specification defines the extension for S1 and X2 interfaces as for standalone operation as X2/Xn for the interface between RAN nodes 922 and S1/NG for the interface 924 between RAN 920 and CN 930. The interface 924 may be defined between two or more RAN nodes 922 (e.g., two or more eNBs/gNBs or a combination thereof) that connect to evolved packet core (EPC), the CN 930, or between eNBs connecting to an EPC. In some implementations, the X2/Xn interface may include an X2/Xn user plane interface (X2-U/Xn-U) and an X2 control plane interface (X2-C/Xn-C). The X2-U/Xn-U may provide flow control mechanisms for user data packets transferred over the X2/Xn interface and may be used to communicate information about the delivery of user data between eNBs or gNBs. For example, the X2-U/Xn-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C/Xn-C may provide intra-LTE access mobility functionality (e.g., including context transfers from source to target eNBs, user plane transport control, etc.), load management functionality, and inter-cell interference coordination functionality.

Alternatively, or additionally, RAN 920 can be also connected (e.g., communicatively coupled) to CN 930 via a Next Generation (NG) interface as interface 924. The NG interface 924 can be split into two parts, a Next Generation (NG) user plane (NG-U) interface 926, which carries traffic data between the RAN nodes 922 and a User Plane Function (UPF), and the S1 control plane (NG-C) interface 928, which is a signaling interface between the RAN nodes 922 and Access and Mobility Management Functions (AMFs).

CN 930 can comprise a plurality of network elements 932, which are configured to offer various data and telecommunications services to customers/subscribers (e.g., users of UEs 110) who are connected to the CN 930 via the RAN 920. In some implementations, CN 930 can include an evolved packet core (EPC), a 5G CN, and/or one or more additional or alternative types of CNs. The components of the CN 930 can be implemented in one physical node or separate physical nodes including components to read and execute instructions from a machine-readable or computer-readable medium (e.g., a non-transitory machine-readable storage medium).

As shown, CN 930, application servers 940, and external networks 950 can be connected to one another via interfaces 934, 936, and 938, which can include IP network interfaces. Application servers 940 can include one or more server devices or network elements (e.g., virtual network functions (VNFs) offering applications that use IP bearer resources with CN 930 (e.g., universal mobile telecommunications system packet services (UMTS PS) domain, LTE PS data services, etc.). Application servers 940 can also, or alternatively, be configured to support one or more communication services (e.g., voice over IP (VOIP sessions, push-to-talk (PTT) sessions, group communication sessions, social networking services, etc.) for UEs 110 via the CN 930. Similarly, external networks 950 can include one or more of a variety of networks, including the Internet, thereby providing the mobile communication network and UEs 110 of the network access to a variety of additional services, information, interconnectivity, and other network features.

In an aspect, the UEs 110-1 and 110-2 can operate as initiator and receiver UEs, respectively in SL communication over an SL channel. The UE 110-1 for example can generate a SL communication by sensing an SL channel with a CCA and by configuring a gap length based on an SCS and a CPE length. Then the UE can transmit the SL communication in response to acquiring the SL channel. The CPE length can be based on a gap length and an SCS utilized for the SL communication. The UE can dynamically generate the CPE with the CPE length and a CCA type of a CCA based on at least one of: an SCI for a shared COT or an SCS. The UE 110-1 is configured to process, perform, generate, communicate or cause execution of any one or more combined further aspects described herein or in association with any of the FIG. 1 thru 8.

Figure 10:
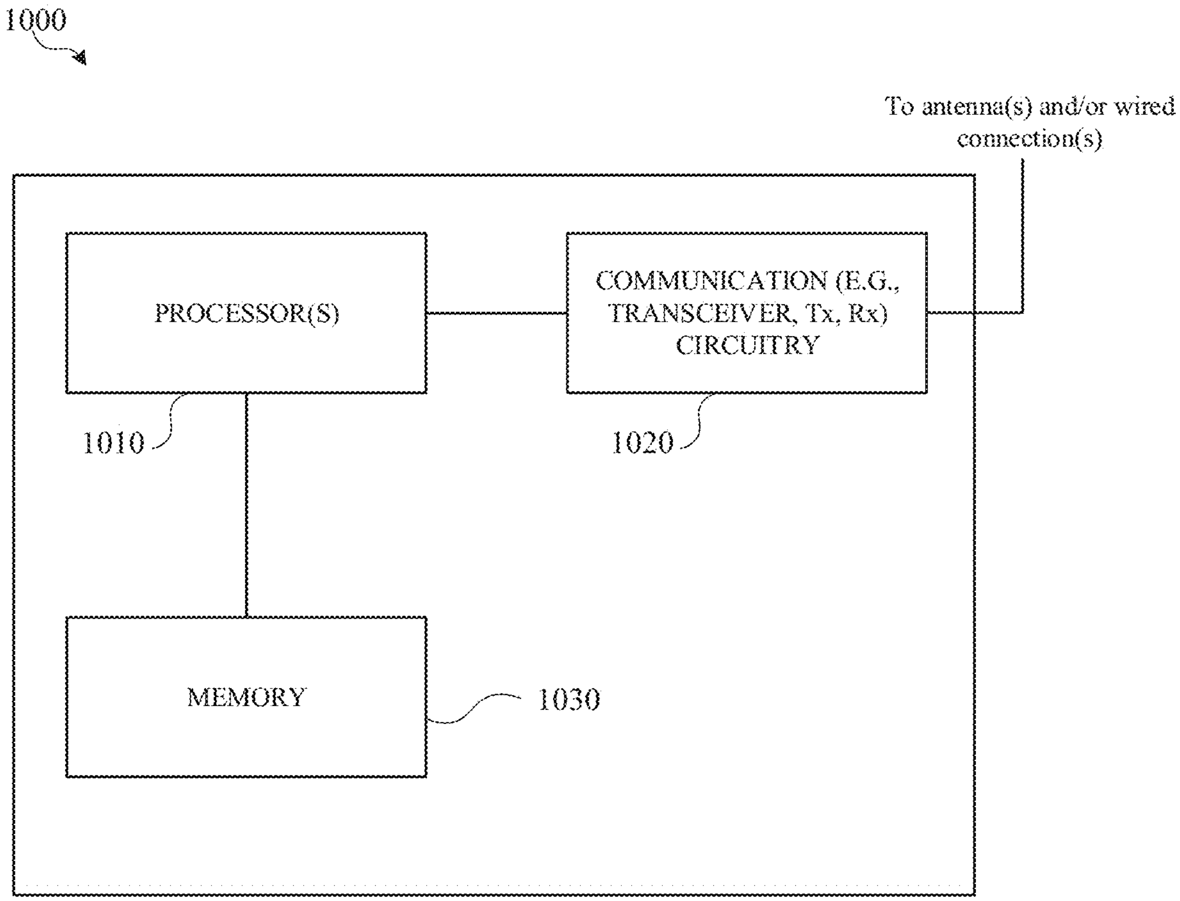
FIG. 10 illustrates an example simplified block diagram of a user equipment (UE) wireless communication device or other network device/component (e.g., eNB, gNB) in accordance with various aspects.

Referring to FIG. 10, illustrated is a block diagram of a UE device 110 (e.g., UE 110-1 or 110-2) or other network component/device 1000 (e.g., V-UE/P-UE, IoT, gNB, eNB, base station or other participating network entity/component). The device 1000 includes one or more processors 1010 (e.g., one or more baseband processors) comprising processing circuitry and associated interface(s), transceiver circuitry 1020 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 1030 (which can comprise any of a variety of storage mediums and can store instructions and/or data associated with one or more of processor(s) 1010 or transceiver circuitry 1020).

Memory 1030 (as well as other memory components discussed herein, e.g., memory, data storage, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Any connection can be also termed a computer-readable medium.

Memory 1030 can include executable instructions, and be integrated in, or communicatively coupled to, processor or processing circuitry 1010. The executable instructions of the memory 1030 can cause processing circuitry 1010 to generate a SL communication by sensing an SL channel with a CCA and configuring a gap length based on a SCS and a CPE with a CPE length and transmit the SL communication in response to acquiring the SL channel. The gap length can be configured with up to two contiguous gap symbols before a PSFCH, at an end of a slot, or before the PSFCH and at the end of the slot. Additionally, or alternatively, sensing of the SL channel can be performed with a sensing length of 25 microseconds with a Type 2A CCA in response to sharing of an SL-U COT with the SL communication. The gap length can comprise two gap symbols with a 60 kHz SCS. Additionally, or alternatively, sensing of the SL channel can be performed with a type 1 CCA before transmitting an SL slot as a non-COT sharing transmission, wherein the gap length of the SL slot comprises up to two gap symbols for 60 kHz SCS. A CPE length can be configured based on a pre-configured CPE length in a resource pool associated with at least one of: a physical sidelink control channel (PSCCH), a physical sidelink shared channel (PSSCH), or a PSFCH in a shared COT.

The device 1000 is configured to process, perform, generate, communicate or cause execution of any one or more combined aspects described herein or in association with any of the FIGS. 1 thru 9.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure is described with reference to attached drawing figures, wherein like reference numerals are used to refer to like elements throughout, and wherein the illustrated structures and devices are not necessarily drawn to scale. As utilized herein, terms “component,” “system,” “interface,” and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can be also a component. One or more components can reside within a process, and a component can be localized on one computer and/or distributed between two or more computers. A set of elements or a set of other components can be described herein, in which the term “set” can be interpreted as “one or more.”

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form. Furthermore, to the extent that the terms “including”, “includes”, “having”, “has”, “with”, or variants thereof are used in either the detailed description and the claims, such terms are intended to be inclusive in a manner similar to the term “comprising.” Additionally, in situations wherein one or more numbered items are discussed (e.g., a “first X”, a “second X”, etc.), in general the one or more numbered items can be distinct, or they can be the same, although in some situations the context can indicate that they are distinct or that they are the same.

As used herein, the term “circuitry” can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is a User Equipment (UE) comprising: processing circuitry, comprising at least one memory, configured to cause the UE to: sense an SL channel with a clear channel assessment (CCA), generate a sidelink (SL) communication by configuring a gap length based on a subcarrier spacing (SCS) and/or a cyclic prefix extension (CPE) that comprises a CPE length in response to acquiring the SL channel; and transmit the SL communication.

A second example can include the first example, wherein the gap length comprises up to two gap symbols when configuring the SL communication with a 60 kHz SCS.

A third example can include the first or second example, wherein the gap length comprises up to two contiguous gap symbols before a physical sidelink feedback channel (PSFCH) transmission, at an end of a slot, or before the PSFCH transmission and at the end of the slot.

A fourth example can include any one or more of the first through third examples, wherein the processing circuitry is further configured to: perform sensing of the SL channel with a sensing length of 25 microseconds in response to sharing of an SL unlicensed (SL-U) COT with the SL communication, wherein the gap length comprises up to two gap symbols.

A fifth example can include any one or more of the first through fourth examples, wherein the processing circuitry is further configured to: perform sensing of the SL channel with a Type 1 CCA before transmitting an SL slot as a non-COT sharing transmission, wherein a gap length of the SL slot comprises up to two gap symbols.

A sixth example can include any one or more of the first through fifth examples, wherein the processing circuitry is further configured to: generate each slot with at least one gap symbol at an end portion of slot symbols when utilizing a partial bandwidth (BW) for the SL communication or based on a sidelink control information (SCI) configuration; and generate one slot with at least one gap symbol at the end portion of slot symbols when utilizing a full BW for the SL communication, wherein in response to the SCS of the SL communication comprising 60 kHz SCS, the at least one gap symbol comprises up to two symbols.

A seventh example can include any one or more of the first through sixth examples, wherein the CPE length is configured based on a pre-configured CPE length in a resource pool, and the processing circuitry is further configured to generate the CPE including the CPE length with only a PSFCH outside of a shared COT, at least one of: a PSCCH or a PSSCH outside of the shared COT when utilizing a partial BW, or with at least one of: a physical sidelink control channel (PSCCH), a physical sidelink shared channel (PSSCH), or a PSFCH within the shared COT.

An eighth example can include any one or more of the first through seventh examples, wherein the CPE length is a default CPE length based on an orthogonal frequency-divisional multiplexing (OFDM) symbol length minus 25 microseconds in a 15 kHz SCS, or a 30 kHz SCS, and based on two OFDM symbol lengths minus 25 microseconds in a 60 kHz SCS for the SL communication.

A ninth example can include any one or more of the first through eighth examples, wherein the processing circuitry is further configured to: generate the SL communication by dynamically generating the CPE with the CPE length and a CCA Type of a CCA based on an SCI indication for a shared COT.

A tenth example can include any one or more of the first through ninth examples, wherein the SCI indication comprises a two bit signaling, wherein for a CCA Type 2A the CPE length comprises one OFDM symbol length minus 25 microseconds, for a CCA Type 2B the CPE length comprises the one OFDM symbol length minus 16 microseconds, and for a CCA Type 2C the CPE length comprises greater than one OFDM symbol length minus 16 microseconds, and in response to a 60 kHz SCS being utilized, the CPE length comprises two OFDM symbol lengths minus microseconds for the CCA Type 2A, minus 16 microseconds for the CCA Type 2B, or greater than two OFDM symbol lengths minus 16 microseconds for the CCA Type 2C.

An eleventh example can include any one or more of the first through tenth examples, wherein the processing circuitry is further configured to: generate the SL communication with multiple CPEs for initiating a COT with a full BW transmission by selecting a starting position at a sensing slot boundary with one OFDM symbol for 15 kHz SCS, or two OFDM symbols for 30 kHz SCS or 60 KHZ SCS.

A twelfth example can be a method of a user equipment (UE) comprising: generating a sidelink (SL) communication by sensing an SL channel with a clear channel assessment (CCA) and configuring a gap length based on a subcarrier spacing (SCS) and a cyclic prefix extension (CPE) with a CPE length; and transmitting the SL communication in response to acquiring the SL channel.

A thirteenth example can include the twelfth example, further comprising: generating each slot with at least one gap symbol at an end portion of slot symbols when utilizing a partial bandwidth (BW) for the SL communication or based on a sidelink control information (SCI) configuration; and generating one slot with at least one gap symbol at the end portion of slot symbols when utilizing a full BW for the SL communication, wherein in response to the SCS of the SL communication comprising 60 kHz SCS, the at least one gap symbol comprises up to two symbols.

A fourteenth example can include any one or more of the twelfth through the thirteenth examples, further comprising: configuring the gap length with up to two contiguous gap symbols before a physical sidelink feedback channel (PSFCH), at an end of a slot, or before the PSFCH and at the end of the slot.

A fifteenth example can include any one or more of the twelfth through the fourteenth examples, further comprising: performing sensing of the SL channel with a sensing length of 25 microseconds with a Type 2A CCA in response to sharing of an SL unlicensed (SL-U) COT with the SL communication, wherein the gap length comprises two gap symbols; or performing sensing of the SL channel with a Type 1 CCA before transmitting an SL slot as a non-COT sharing transmission, wherein the gap length of the SL slot comprises up to two gap symbols.

A sixteenth example can include any one or more of the twelfth through the fifteenth examples, further comprising: configuring the CPE length based on a pre-configured CPE length in a resource pool associated with at least one of: a physical sidelink control channel (PSCCH), a physical sidelink shared channel (PSSCH), or a PSFCH in a shared COT.

A seventeenth example can include any one or more of the twelfth through the sixteenth examples, further comprising: generating the CPE length with only a PSFCH in an initiating COT or at least one of: a PSCCH or a PSSCH outside of a shared COT when utilizing a partial BW, or with at least one of: a physical sidelink control channel (PSCCH), a physical sidelink shared channel (PSSCH), or a PSFCH, in the shared COT.

An eighteenth example can be a baseband processor configured to: generate a sidelink (SL) communication by sensing an SL channel with a clear channel assessment (CCA) and configuring a gap length based on a subcarrier spacing (SCS) and a cyclic prefix extension (CPE) with a CPE length; and transmit the SL communication in response to acquiring the SL channel.

A nineteenth example can include the eighteenth example, wherein the CPE length is based on a gap length and a subcarrier spacing (SCS) utilized for the SL communication.

A twentieth example can include any one or more of the eighteenth through nineteenth examples, further configured to: generate the SL communication by dynamically generating the CPE with the CPE length and a CCA Type of a CCA based on at least one of: an SCI for a shared COT or an SCS.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A User Equipment (UE) comprising:
radio frequency (RF) circuitry; and
processing circuitry, comprising a memory, the processing circuitry configured to execute instructions stored in the memory to cause the UE to:
configure, for a sidelink (SL) communication within a shared channel occupancy time (COT), a cyclic prefix extension (CPE) length and a gap length based on a subcarrier spacing (SCS) for the SL communication, wherein the CPE length is dependent on the gap length, and wherein the gap length comprises one or two contiguous gap symbols; and transmit, via the RF circuitry, the SL communication based on the CPE length and the gap length.

2. The UE of claim 1, wherein the one or two contiguous gap symbols are at an end of a slot.

3. The UE of claim 1, wherein the processing circuitry is further configured to cause the UE to:

perform sensing of the SL channel with a sensing length of 25 microseconds in response to channel occupancy time (COT) being active for the SL communication.

4. The UE of claim 1, wherein the processing circuitry is further configured to cause the UE to:

generate each slot with at least one gap symbol at an end portion of slot symbols when utilizing a partial bandwidth (BW) for the SL communication or based on an SL control information (SCI) configuration; and generate one slot with at least one gap symbol at the end portion of slot symbols when utilizing a full BW for the SL communication, wherein in response to the SCS of the SL communication comprising a 60 kHz SCS, the at least one gap symbol comprises up to two symbols.

5. The UE of claim 1, wherein the CPE length is a default CPE length, wherein the default CPE length is based on an orthogonal frequency-division multiplexing (OFDM) symbol length minus 25 microseconds in a 15 kHz SCS or a 30 kHz SCS for the SL communication, and wherein the default CPE length is based on two OFDM symbol lengths minus 25 microseconds in a 60 kHz SCS for the SL communication.

6. The UE of claim 1, wherein the processing circuitry is further configured to:

generate the SL communication by dynamically generating a CPE with the CPE length and a clear channel assessment (CCA) Type of a CCA based on an SL control information (SCI) indication for a shared COT.

7. The UE of claim 6, wherein the SCI indication comprises a two bit signaling, wherein for a CCA Type 2A the CPE length comprises one orthogonal frequency-division multiplexing (OFDM) symbol length minus 25 microseconds, for a CCA Type 2B the CPE length comprises the one OFDM symbol length minus 16 microseconds, and for a CCA Type 2C the CPE length comprises greater than one OFDM symbol length minus 16 microseconds, and in response to a 60 kHz SCS being utilized, the CPE length comprises two OFDM symbol lengths minus 25 microseconds for the CCA Type 2A, minus 16 microseconds for the CCA Type 2B, or greater than two OFDM symbol lengths minus 16 microseconds for the CCA Type 2C.

8. The UE of claim 1, wherein the processing circuitry is further configured to cause the UE to:

generate the SL communication with multiple CPEs for initiating a COT with a full bandwidth (BW) transmission by randomly selecting a starting position at a sensing slot boundary with one orthogonal frequency-division multiplexing (OFDM) symbol for 15 kHz SCS, or two OFDM symbols for 30 kHz SCS or 60 kHz SCS.

9. A method of a user equipment (UE) comprising:

configuring, for a sidelink (SL) communication within a shared channel occupancy time (COT), a cyclic prefix extension (CPE) length and a gap length based on a subcarrier spacing (SCS) for the SL communication, wherein the CPE length is dependent on the gap length, and wherein the gap length comprises one or two contiguous gap symbols; and transmitting the SL communication based on the CPE length and the gap length.

10. The method of claim 9, further comprising:

generating each slot with at least one gap symbol at an end portion of slot symbols when utilizing a partial bandwidth (BW) for the SL communication or based on an SL control information (SCI) configuration; and generating one slot with at least one gap symbol at the end portion of slot symbols when utilizing a full BW for the SL communication;

wherein in response to the SCS of the SL communication comprising 60 kHz SCS, the at least one gap symbol comprises up to two symbols.

11. The method of claim 9, wherein the one or two contiguous gap symbols are at an end of a slot.

12. The method of claim 9, further comprising:

performing sensing of the SL channel with a sensing length of 25 microseconds with a Type 2A CCA in response to sharing of an SL unlicensed (SL-U) channel occupancy time (COT) with the SL communication, wherein the gap length comprises two gap symbols; or performing sensing of the SL channel with a Type 1 CCA before transmitting an SL slot as a non-COT sharing transmission, wherein the gap length of the SL slot comprises up to two gap symbols.

13. The method of claim 9, further comprising:

configuring the CPE length based on a pre-configured CPE length in a resource pool associated with at least one of: a physical sidelink control channel (PSCCH), a physical sidelink shared channel (PSSCH), or a physical sidelink feedback channel (PSFCH) in a shared COT.

14. The method of claim 9, further comprising:

generating the CPE length with only a physical sidelink feedback channel (PSFCH) in an initiating COT or at least one of: a physical sidelink control channel (PSCCH) or a physical sidelink shared channel (PSSCH) outside of a shared COT when utilizing a partial bandwidth (BW), or with at least one of: a PSCCH, a PSSCH, or a PSFCH, in the shared COT.

15. A baseband processor configured to, when executing instructions stored in a memory, perform operations comprising:

configuring, for a sidelink (SL) communication within a shared channel occupancy time (COT), a CPE length and a gap length based on a subcarrier spacing (SCS) for the SL communication, wherein the CPE length is dependent on the gap length, and wherein the gap length comprises one or two contiguous gap symbols; and providing, to an interface with radio frequency (RF) circuitry, the SL communication for transmission by the RF circuitry based on the CPE length and the gap length.

16. The baseband processor of claim 15, wherein the operations further comprise:

generating the SL communication by dynamically generating a CPE with the CPE length and a clear channel assessment (CCA) Type of a CCA based on at least one of: a SL control information (SCI) for a shared COT or an SCS.

17. The UE of claim 1, wherein the gap length comprises one symbol when the SCS for the SL communication is a 15 kilohertz (kHz) SCS or a 30 kHz SCS, and wherein the gap length comprises two symbols when the SCS for the SL communication is a 60 kHz SCS.

18. The UE of claim 1, wherein the gap length is based on a channel access priority class (CAPC) associated with the SL communication.

19. The UE of claim 1, wherein the processing circuitry is further configured to cause the UE to:

configure, for a second SL communication outside of the shared COT, a second CPE length based on a default CPE length configured for a resource pool associated with the second SL communication; and transmit, via the RF circuitry, the second SL communication based on the second CPE length.

20. The UE of claim 1, wherein the processing circuitry is further configured to cause the UE to:

configure, for a second SL communication outside of the shared COT, a second CPE length by randomly choosing a starting position for the second CPE length; and transmit, via the RF circuitry, the second SL communication based on the second CPE length.

* * * * *